(12) United States Patent
Mukai et al.

(10) Patent No.: US 11,110,756 B2
(45) Date of Patent: Sep. 7, 2021

(54) PNEUMATIC TIRE AND METHOD OF MANUFACTURING SAME

(71) Applicant: Sumitomo Rubber Industries, Ltd., Kobe (JP)

(72) Inventors: Yu Mukai, Kobe (JP); Yoshiaki Kanematsu, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 447 days.

(21) Appl. No.: 15/597,490

(22) Filed: May 17, 2017

(65) Prior Publication Data

US 2017/0334250 A1 Nov. 23, 2017

(30) Foreign Application Priority Data

May 19, 2016 (JP) .............................. JP2016-100480

(51) Int. Cl.
*B60C 19/08* (2006.01)
*B29D 30/06* (2006.01)
(Continued)

(52) U.S. Cl.
CPC ........ *B60C 19/082* (2013.01); *B29D 30/0606* (2013.01); *B60C 11/1392* (2013.01);
(Continued)

(58) Field of Classification Search
CPC ............... B60C 19/082; B60C 11/1392; B60C 11/0304
USPC .......................................... 152/152.1, DIG. 2
See application file for complete search history.

(56) References Cited

U.S. PATENT DOCUMENTS

D733,636 S * 7/2015 Janesh ......................... D12/520
2014/0053961 A1* 2/2014 Shimomura ............ B29D 30/60
152/152.1
(Continued)

FOREIGN PATENT DOCUMENTS

EP 1106395 A2 6/2001
EP 2230105 A1 9/2010
(Continued)

OTHER PUBLICATIONS

Machine translation of JP05-319026 (no date).*
Extended European Search Report dated Oct. 18, 2017, for European Application No. 17169618.0.

*Primary Examiner* — Steven D Maki
*Assistant Examiner* — Philip N Schwartz
(74) *Attorney, Agent, or Firm* — Birch, Stewart, Kolasch & Birch, LLP

(57) ABSTRACT

A pneumatic tire is provided in the tread portion with a land portion including a conductive portion made of a conductive rubber. The conductive portion has a radially inner end electrically connected to a conductive tire internal structural to be connected to a wheel rim, and a radially outer end exposed in a ground contacting top surface of the land portion. The conductive portion extends from its radially inner end to outer end while inclining toward a first side surface of the land portion. The first side surface comprises a radially inner part, and a radially outer part extending radially outwardly from the radially inner part while inclining to the radially outer end of the conductive portion at an angle greater than the radially inner part.

15 Claims, 6 Drawing Sheets

(51) Int. Cl.
  *B60C 11/13* (2006.01)
  *B29D 30/52* (2006.01)
  *B60C 11/03* (2006.01)

(52) U.S. Cl.
  CPC ............... *B29D 2030/0612* (2013.01); *B29D 2030/526* (2013.01); *B29K 2995/0005* (2013.01); *B60C 11/0304* (2013.01)

(56) References Cited

U.S. PATENT DOCUMENTS

2014/0305563 A1* 10/2014 Kujime ............... B60C 11/1204
                                                                 152/209.18
2017/0282651 A1* 10/2017 Suzuki ................ B60C 11/1204

FOREIGN PATENT DOCUMENTS

JP       05319026 A  * 12/1993  ............. B60C 11/00
JP       2010-115935 A   5/2010

* cited by examiner

PNEUMATIC TIRE AND METHOD OF MANUFACTURING SAME

TECHNICAL FIELD

The present invention relates to a pneumatic tire having a conductive portion for electrostatic discharge and a manufacturing method therefor.

BACKGROUND ART

There has been proposed a pneumatic tire having a tread portion made of a silica-rich compound in order to exhibit excellent grip performance, while reducing the rolling resistance.

In general, a silica-rich compound has a high electric resistance, therefore, it is difficult for the tread portion made of such silica-rich compound to smoothly discharge static electricity occurred in the vehicle to the ground. This tends to cause radio interference such as radio noise.

Japanese Patent Application Publication No. 2010-115935 discloses a pneumatic tire provided with a conductive portion for electrostatic discharge, wherein the conductive portion has a radially outer end exposed in the tread surface and a radially inner end electrically connected to an internal structure of the tire which electrically contacts with the wheel rim, and in the tread portion, the conductive portion extends obliquely from its radially inner end to outer end.

On the other hand, during vulcanization-molding a tire, a tread rubber compound near the ground contacting surface of a land portion such as block, rib and the like, tends to flow toward its sides from the center. As a result, there is a possibility that the radially outer end portion of the above-mentioned obliquely extending conductive portion is moved during vulcanization, and the inclination angle thereof becomes more acute near the ground contacting surface.
In such cases, there is a possibility that a separation failure occurs starting from the radially outer end of the conductive portion appearing in the ground contacting surface.

SUMMARY OF THE INVENTION

It is therefore, an object of the present invention to provide a pneumatic tire and a manufacturing method therefor, in which the tread portion can be improved in the durability by improving the shape of a side surface of a land portion in which an obliquely extending conductive portion is provided.

According to one aspect of the present invention, a pneumatic tire comprises:

a tread portion provided with a land portion having a top surface for contacting with the ground, the land portion having a first side surface extending radially inwardly from a first axial edge of the top surface, and a second side surface extending radially inwardly from a second axial edge of the top surface, the land portion provided with a conductive portion made of a conductive rubber, the conductive portion having a radially outer end exposed in the above-said top surface, and a radially inner end electrically connected to a conductive internal structure of the tire which is to be electrically connected to a wheel rim when the tire is mounted on the wheel rim, wherein in a cross section of the land portion taken along a plane including the rotational axis of the tire, the conductive portion inclines to the first side surface of the land portion toward the radially outer end from the radially inner end of the conductive portion, and the first side surface comprises a radially inner part and a radially outer part extending from the radially inner part to the first axial edge while inclining to the conductive portion at an inclination angle being larger than an inclination angle of the radially inner part.

In the pneumatic tire according to the present invention, such first side surface of the land portion can restrain a flow of the raw tread rubber toward the first side surface which flow is possible to occur during vulcanization-molding, therefore, the radially outer end of the conductive portion is prevented from being moved toward the first side surface in the vulcanized tire, and the angle between the conductive portion and the ground contacting top surface can be maintained (as original). Accordingly, a separation failure starting from the radially outer end of the conductive portion can be prevented, and the durability of the tread portion is improved.

The pneumatic tire according to the present invention may further include the following features (1)-(5):

(1) in the above-said cross section of the land portion, the radially outer end of the conductive portion is closer to the first axial edge than the second axial edge;

(2) in the above-said cross section of the land portion, the angle between the conductive portion and the above-said top surface is not less than 40 degrees and not more than 90 degrees;

(3) the distance from the first axial edge to the radially outer end of the conductive portion is at least 1.5 mm;

(4) in the above-said cross section of the land portion, an area surrounded by the above-said radially outer part, an axially extended line of the above-said top surface and a radially outwardly extended line of the above-said radially inner part is in a range from 1.0% to 2.5% of the overall area of the land portion;

(5) in the above-said cross section of the land portion, a radial height of the above-said radially outer part of the first side surface is in a range from 30% to 60% of the radial height of the land portion.

According to another aspect of the present invention, a method of manufacturing a pneumatic tire comprises:

a raw tire forming process of forming a raw tire comprising a raw tread portion including a conductive portion made of a conductive rubber extending obliquely from a radially inside to outside of the tire and having a radially outer end exposed in a ground contacting surface of the tire, and a vulcanization process in which, by vulcanization-molding the raw tire in a mold comprising a first protrusion and a second protrusion for forming grooves on both sides in the tire axial direction of the above-said radially outer end of the conductive portion, a land portion defined between the first protrusion and the second protrusion and including the above-said conductive portion is formed, wherein in the above-said vulcanization process, the vulcanization-molding of the raw tire is made by disposing the above-said radially outer end of the conductive portion closely to the first protrusion than the second protrusion, and restraining a flow of the raw tread rubber toward the first protrusion from an axial central area of the land portion, than a flow of the raw tread rubber toward the second protrusion from a vicinity of the radially outer end of the conductive portion.

In the method according to the present invention, a flow of the raw tread rubber toward the first protrusion is restrained to prevent the radially outer end of the conductive portion from moving toward the first protrusion, therefore, the angle between the conductive portion and the ground contacting top surface can be maintained.

The method according to the present invention may further include the following features (A)-(C):

(A) the above-said first protrusion has an inclined surface for abutting on a first side surface of the above-said land portion, the above-said second protrusion has an inclined surface for abutting on a second side surface of the above-said land portion, the above-said inclined surfaces of the first and second protrusions are inclined so as to approach each other toward the radially outside, and the above-said inclined surface of the first protrusion is at least partially provided with a part inclined more than the above-said inclined surface of the second protrusion;

(B) the more inclined part of the inclined surface of the first protrusion is formed as a radially outer part of the inclined surface of the first protrusion;

(C) the more inclined part of the inclined surface of the first protrusion extends over the entire inclined surface of the first protrusion.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

DESCRIPTION OF THE PREFERRED EMBODIMENTS

Figure 1:
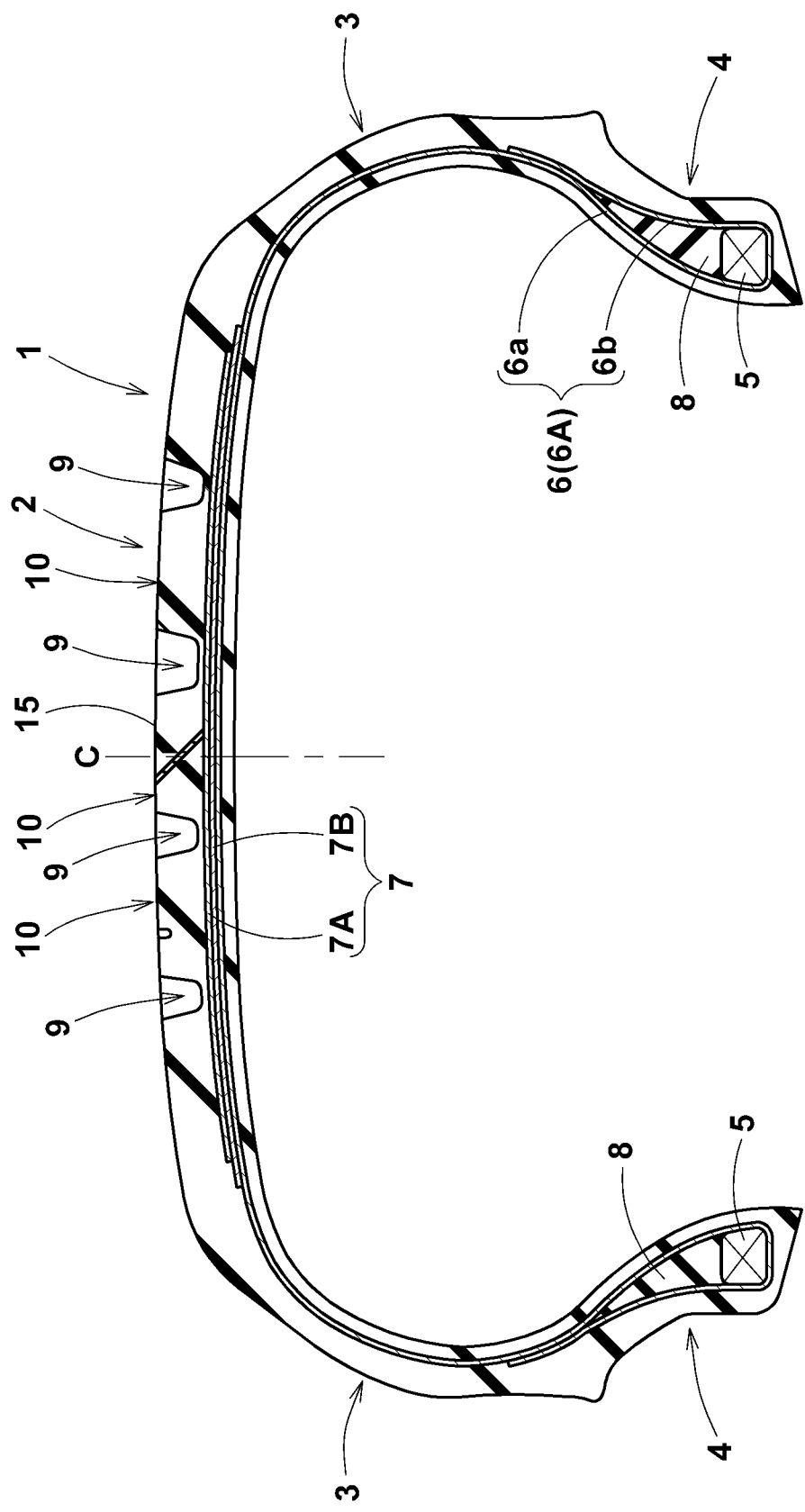
FIG. 1 is a cross-sectional view of a pneumatic tire as an embodiment of the present invention.

The present invention can be applied to various pneumatic tires, e.g. passenger car tires, heavy duty tires and the like and a method of manufacturing the same.

Taking a passenger car tire as an example, embodiments of the present invention will now be described with reference to the accompanying drawings.

In the drawings, pneumatic tire 1 according to the present invention comprises a tread portion 2, a pair of sidewall portions 3, a pair of bead portions 4 each with a bead core 5 embedded therein, and a carcass 6 extending between the bead portions 4 through the tread portion 2 and the sidewall portions 3.

FIG. 1 shows an embodiment which is a pneumatic tire 1 for passenger cars.

The carcass 6 in this embodiment is composed of a single ply 6A of cords rubberized with a topping rubber. But, the carcass 6 may be composed of two or more plies 6A of rubberized cords. In each ply, the carcass cords are arranged radially at an angle of from 70 to 90 degrees with respect to the tire equator C, for example. The carcass ply 6A extends between the bead portions 4 through the tread portion 2 and the sidewall portions 3, and is turned up around the bead core 5 in each bead portion 5, for example from the axially inside to outside of the tire, so as to form a pair of turnup portions 6b and a main portion 6a therebetween.

For example, organic fiber cords such as aramid, rayon and the like are used as the carcass cords.

The bead portions 4 are each provided between the main portion 6a and turnup portion 6b with a bead apex 8 made of hard rubber and extending radially outwardly from the bead core 5 in order to reinforce the bead portion.

The tread portion 2 is provided with a tread reinforcing belt 7. The belt 7 is disposed radially outside the carcass 6. In this embodiment, the belt 7 is composed of two cross plies 7A and 7B of parallel cords rubberized with a topping rubber. In this embodiment, steel cords are used as the belt cords, but high modulus organic fiber cords, e.g. aramid, rayon and the like can be used as necessary.

As to the topping rubber of the belt cords, rubber compounds suitable for the carcass ply 6A may be suitably used too.

In this embodiment, the carcass 6 and belt 7 constitute a part of an electrically conductive tire internal structure continued from the tread portion to the bead portion to electrically contact with an electrically conductive wheel rim.

The tread portion 2 is axially divided by a plurality of circumferential main grooves 9 into land portions 10.

The land portions 10 include one provided with a conductive portion 20 made of a conductive rubber.

In this application, the term "conductive rubber" means a rubber compound whose volume resistivity is less than $1 \times 10^8$ ohm cm.

The volume resistivity is measured with a resistance meter using a specimen having an appropriate sizes for example 15 cm×15 cm×2 mm under the following conditions: applied voltage 500V, air temperature 25 deg. C., and humidity 50%.

In this embodiment, the conductive portion 20 is provided in only the center land portion 18 disposed at the tire equator C. But, the position of the conductive portion 20 is not limited to only the center land portion 18.

Figure 2:
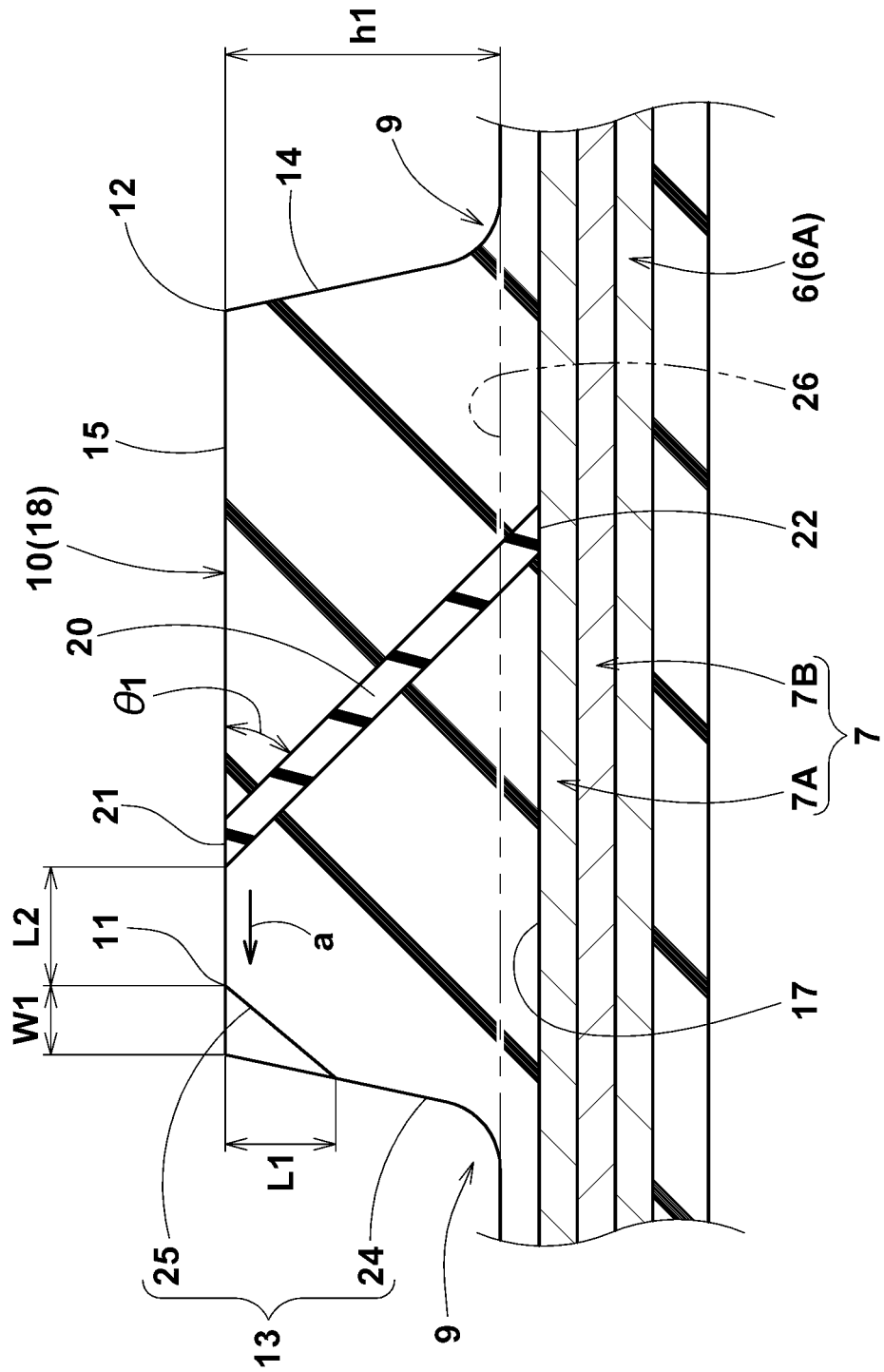
FIG. 2 is an enlarged cross sectional view of a center land portion of the tread portion of the tire shown in FIG. 1.

FIG. 2 shows a cross section of the land portion 10 with the conductive portion 20 taken along a plane including the tire rotational axis. As shown, the land portion 10 has a ground contacting top surface 15 having a first axial edge 11 and a second axial edge 12, a first side surface 13 extending radially inwardly from the first axial edge 11, and a second side surface 14 extending radially inwardly from the second axial edge 12.

The conductive portion 20 has a radially outer end 21 exposed in the ground contacting top surface 15 at a position between the first axial edge 11 and second axial edge 12, and a radially inner end 22 electrically connected to an internal structure 17 of the tire which electrically contacts with a wheel rim when the tire is mounted on the wheel rim (in this embodiment, the radially inner end 22 is electrically connected to the belt 7 of the tire internal structure).

Figure 3:
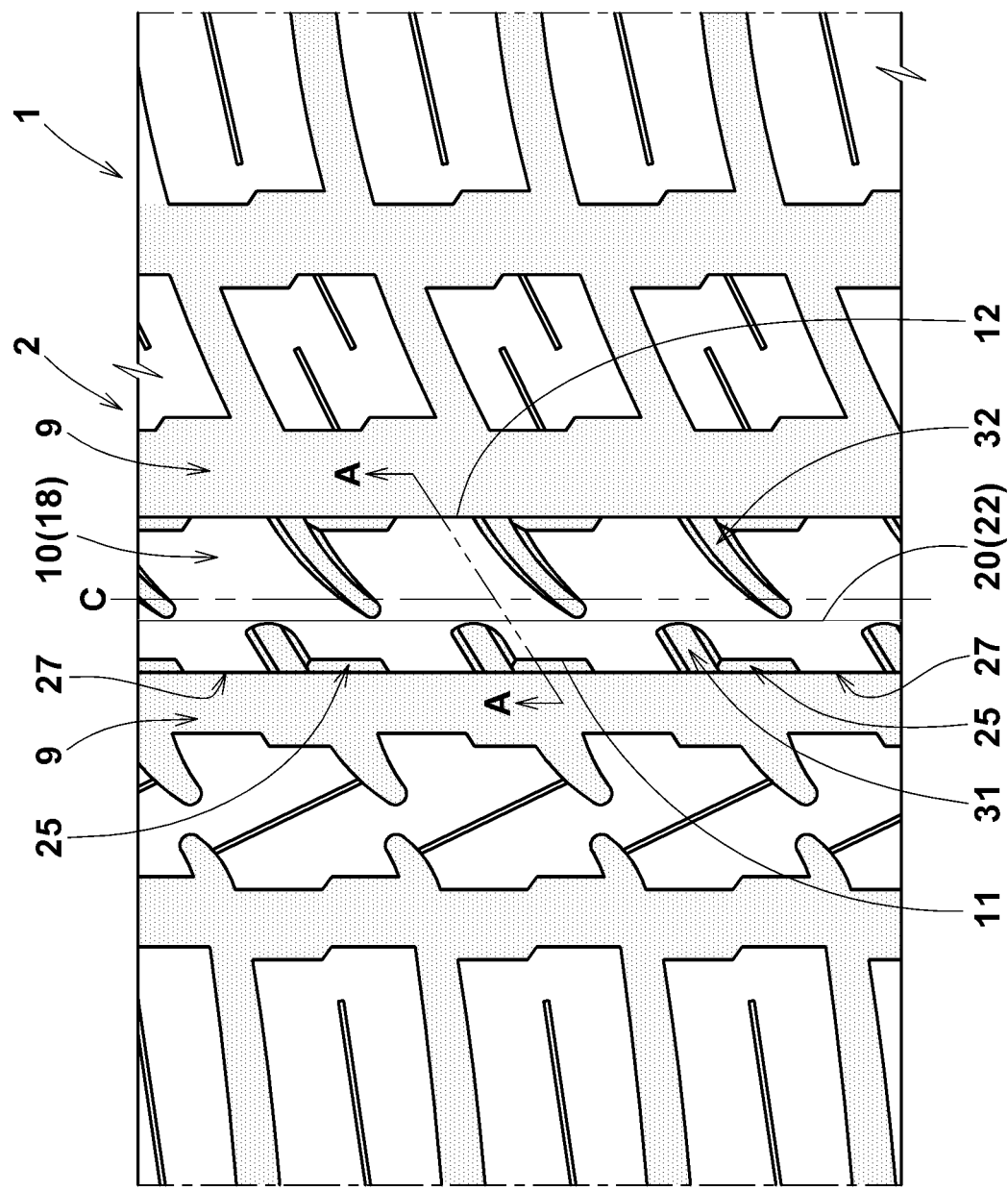
FIG. 3 is a developed partial plan view of the pneumatic tire showing a tread pattern.

In the tread surface, as shown in FIG. 3, the radially outer end 21 of the conductive portion 20 is formed continuously in the tire circumferential direction.

As shown in FIG. 2, the conductive portion 20 extends from the radially inner end 22 to the radially outer end 21 while inclining toward the first side surface 13, and the radially outer end 21 is positioned toward the first axial edge 11 of the ground contacting top surface 15. That is, the radially outer end 21 is located on the first axial edge 11 side of the axial center of the land portion 10.

The distance L2 between the radially outer end 21 and the first axial edge 11 is set to be not less than 1.5 mm, for example, set in a range from 1.5 to 2.5 mm. If the distance L2 is less than 1.5 mm, there is a possibility that a separation failure of the conductive portion 20 from the adjacent rubber starts from the radially outer end 21.

Preferably, the angle θ1 between the conductive portion 20 and the ground contacting top surface 15 is set in a range of not less than 40 degrees, but not more than 90 degrees, preferably not more than 80 degrees, more preferably not more than 60 degrees in view of the durability and the separation failure.

The center land portion 18 with the conductive portion 20 in this embodiment is a circumferentially continuous rib, and the radially outer end 21 of the conductive portion 20 extends straight and continuously in the tire circumferential direction. Thus, the conductive portion 20 can steadily discharge static electricity to the ground.

In this embodiment, both edges 11 and 12 of the center land portion 18 are chamfered. Each edge may be chamfered along its entire length, but in this embodiment, each edge is periodically chamfered. Thus, in each edge 11, 12, chamfered portions 25 and non-chamfered portions 27 alternate in the tire circumferential direction as shown in FIG. 3.

Further, the center land portion 18 in this embodiment is provided with first center lug grooves 31 extending from the first axial edge 11 toward the conductive portion 20, and second center lug grooves 32 extending from the second axial edge 12 toward the conductive portion 20.

The first center lug grooves 31 in this embodiment are inclined with respect to the tire axial direction. Preferably, the first center lug grooves 31 are connected to the respective chamfered portions 25. The second center lug grooves 32 in this embodiment are inclined with respect to the tire axial direction, preferably to the same direction as the first center lug grooves 31. Preferably, the second center lug grooves 32 are connected to the respective chamfered portions 25.

The second center lug grooves 32 have a length greater than the first center lug grooves 31.

Such arrangement of the center lug grooves 31 and 32 serve to exert excellent wet performance, while suppressing the uneven wear of the center land portion 18.

As shown in FIG. 2, the first side surface 13 at each circumferential position at which the chamfered portion 25 is formed, comprises a radially outer part (the surface of the chamfered portion 25) extending from the first axial edge 11 toward the radially inside, and a radially inner part 24 extending from the radially outer part (25) toward the radially inside, wherein the inclination angle of the radially outer part (25) is greater than the inclination angle of the radially inner part 24.

Similarly, the second side surface 14 at each circumferential position at which the chamfered portion 25 is formed, comprises a radially outer part (the surface of the chamfered portion 25) extending from the second axial edge 12 toward the radially inside, and a radially inner part 24 extending from the radially outer part (25) toward the radially inside.

As shown in FIG. 2, the second side surface 14 at each circumferential position at which the chamfered portion 25 is not formed, extends from the second axial edge 12 toward the bottom of the adjacent main groove 9 with a single inclination angle. Similarly, the first side surface 13 at each circumferential position at which the chamfered portion 25 is not formed, extends from the first axial edge 11 toward the bottom of the adjacent main groove 9 with a single inclination angle.

In the land portion 10 provided with the chamfered portions 25, the tread rubber during vulcanization-molding can be suppressed from flowing toward the chamfered portions 25.

In general, when vulcanization molding the raw tread rubber, the fluidized tread rubber flows from the center side in the width direction of the land portion to the first and second axial edge sides. However, by forming the chamfered portions 25, the distance of the flow (a) of the rubber toward the chamfered portions 25 can be relatively decreased, and the movement of the radially outer end 21 is decreased. Thus, the angle θ1 between the conductive portion 20 and the ground contacting top surface 15 can be maintained at the designed value during vulcanization-molding. As a result, a separation failure of the conductive portion 20 starting from the radially outer end 21 can be prevented, and the durability of the tread portion 2 can be improved.

In order to reduce the rubber flow toward the chamfered portion 25 while suppressing an excessive decrease in the volume of the land portion 10, it is preferred that the chamfered portion 25 has a radial height L1 in a range from 30% to 60% of the overall height h1 of the land portion 10 measured in the radial direction from the base line 26 drawn between the groove bottoms of the main grooves 9 on both sides of the land portion 10, and an axial width W1 of preferably not less than 1.5 mm, more preferably not less than 1.8 mm, but preferably not more than 2.5 mm, more preferably not more than 2.2 mm at the ground contacting top surface 15.

In the cross section of the land portion 10 taken along a plane including the tire rotational axis, the cross sectional area Sb of the chamfered portion 25 is preferably not less than 1.0%, more preferably not less than 1.5%, but preferably not more than 2.5%, more preferably not more than 2.0% of the overall cross sectional area Sa of the land portion 10 in order to effectively derive the above described advantages effect.

In FIG. 2, the cross sectional area Sb of the chamfered portion 25 is the area of a triangle illustrated at the upper left corner of the land portion 10. That is, the area Sb is of a triangle surrounded by the chamfered surface line (25), an axially extended line of the ground contacting top surface 15, and a radially outwardly extended line of the radially inner part 24. The overall cross sectional area Sa is the area on the radially outside of the above-mentioned base line 26.

Next, as an embodiment according to another aspect of the present invention, a method of manufacturing the above-described pneumatic tire will be described.

The manufacturing method in this embodiment comprises a process S1 of forming a raw tire, and a process S2 of vulcanization-molding the raw tire.

<Process S1 of forming Raw tire>

In the process S1, a raw tire 35 comprising a tread portion made of a raw tread rubber 36 is formed. The raw tread rubber 36 includes a conductive rubber compound for forming the conductive portion 20 and a less-conductive or nonconductive rubber compound forming the other portion than the conductive portion 20.

Figure 4A:
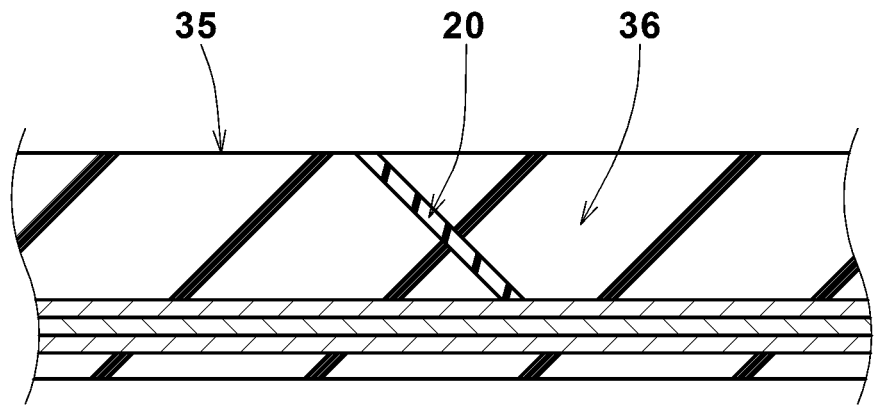
FIGS. 4(a), 4(b) and 4(c) are sectional partial views each showing an example of the tread portion of the raw tire.
Figure 4B:
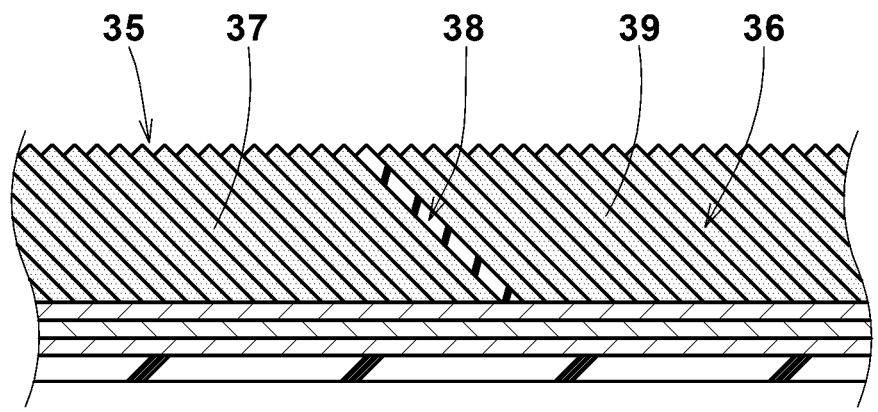
Figure 4C:
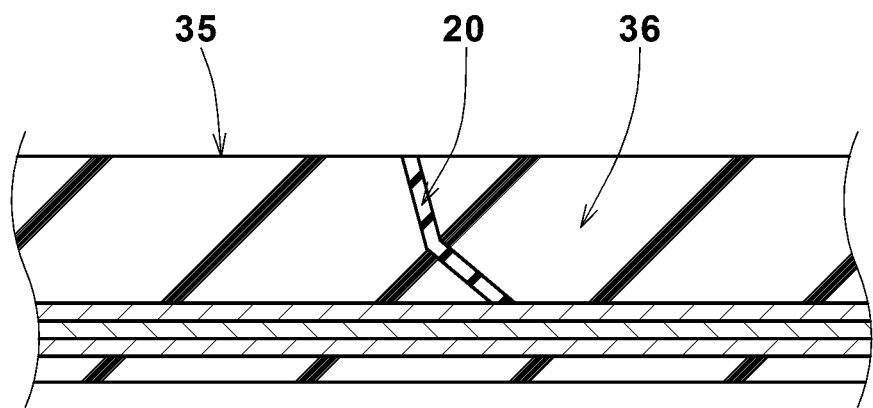

FIGS. 4(a), 4(b) and 4(c) are cross sectional views each showing an example of the tread portion of the raw tire 35.

In the example shown in FIG. 4(a), a tape of the conductive rubber compound for forming the conductive portion 20 is sandwiched between strips of the less-conductive or nonconductive rubber compound. Such raw tread rubber 36 can be formed by applying the tape and strips sequentially around a tire building drum or around the tread reinforcing belt/band, or extruding the rubber compounds at the same time, or through another appropriate manner.

In the example shown in FIG. 4(b), the raw tread rubber 36 is formed by spirally winding rubber tapes, for example, a first rubber tape 37 of a nonconductive or less-conductive silica-rich rubber compound, and a second rubber tape 38 of conductive rubber compound such as carbon-rich rubber compound.

In order to form the raw tread rubber 36, for example, the first rubber tape 37 is wound to form a part on one side of the conductive portion 20, and then the second rubber tape 38 is wound to form the conductive portion 20, and again the first rubber tape 37 is wound to form a part on the other side of the conductive portion 20. As a result, the conductive portion 20 extending continuously in the tire circumferential direction and extending obliquely from the radially inside to the radially outside of the tire is formed.

In the example shown in FIG. 4(c), the angle of the conductive portion 20 with respect to the tire axial direction is increased toward the radially outside of the tire. Such conductive part 20 is increased in the adhesion area with the raw tread rubber 36 to improve the durability.

<Process S2 of vulcanization-molding Raw tire>

In the process S2, the raw tire 35 formed in the process S1 is put in a mold 40 and vulcanization molded.

Figure 5A:
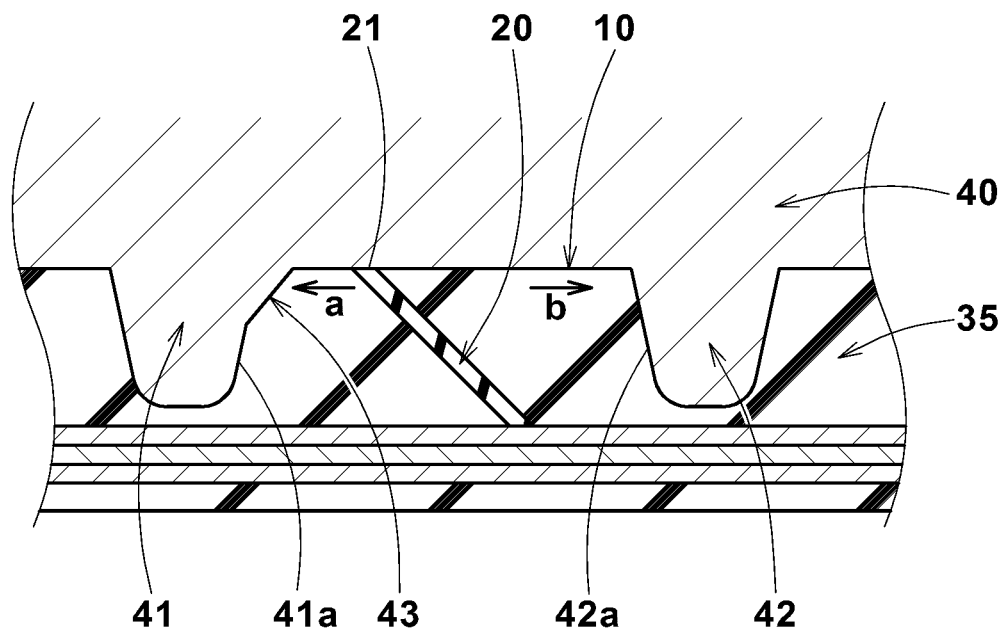
FIGS. 5(a) and 5(b) are sectional partial views each showing an example of the tire vulcanizing mold used in a method of manufacturing a pneumatic tire according to the present invention.
Figure 5B:
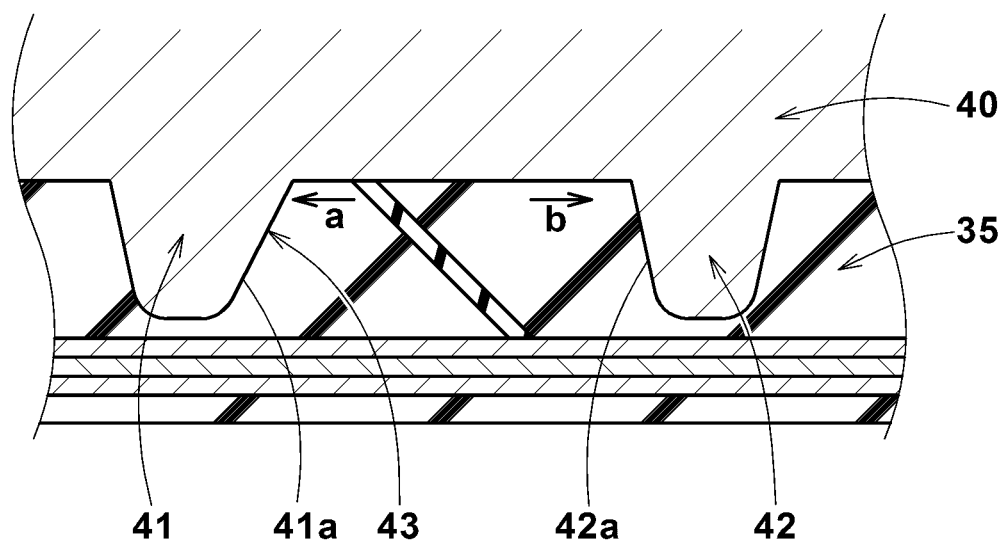

FIGS. 5(a) and 5(b) each show a part of an example of the mold 40.

The mold 40 comprises a first protrusion 41 and a second protrusion 42 for forming grooves between which the land portion 10 is defined. Namely, the first and second protrusions 41 and 42 are positioned on both sides in the tire axial direction of the radially outer end 21 of the conductive portion 20.

In the vulcanization-molding process S2, the raw tire 35 is vulcanization-molded such tat the radially outer end 21 of the conductive portion 20 is positioned closely to the first protrusion 41 than the second protrusion 42, and a flow (a) of the raw tread rubber 36 toward the first protrusion 41 from an axial central area of the land portion 10 is restrained than a flow (b) of the raw tread rubber 36 toward the second protrusion 42 from a vicinity of the radially outer end 21 of the conductive portion 20.

Thus, the radially outer end 21 of the conductive portion 20 can be prevented from moving toward the first protrusion 41. And the angle between the conductive portion 20 and the ground contacting top surface can be prevented from becoming more acute, and it is possible to maintain the angle in the raw tire.

The first protrusion 41 has an inclined surface 41a for abutting on the first side surface 13 of the land portion 10. The second protrusion 42 has an inclined surface 42a for abutting on the second side surface 14 of the land portion 10. The inclined surfaces 41a and 42a are inclined so as to approach each other toward the radially outside.

In order to restrain the flow (a) of the raw tread rubber 36 toward the first protrusion 41, the inclined surface 41a of the first protrusion 41 is at least partially provided with a part 43 inclined more than the inclined surface 42a of the second protrusion 42.

In the example shown in FIG. 5(a), the more inclined part 43 is formed as the radially outermost part of the inclined surface 41a of the first projection 41.

In the example shown in FIG. 5(b), the more inclined part 43 is formed to extend over the entire inclined surface 41a of the first protrusion 41 in order to form a large main groove while obtaining the above described effect.

While detailed description has been made of preferable embodiments of the present invention, the present invention can be embodied in various forms without being limited to the illustrated embodiments.

WORKING EXAMPLES

Based on the structure shown in FIG. 1, pneumatic tires of size 225/40R18 (rim size 18×8J) for passenger cars were experimentally manufactured as test tires (comparative example Ref and working examples Ex1-Ex12) and measured for the electric resistance and tested for the durability of the tread portion. Specifications of the test tires are shown in Table 1.

<Electric resistance>

Figure 6:
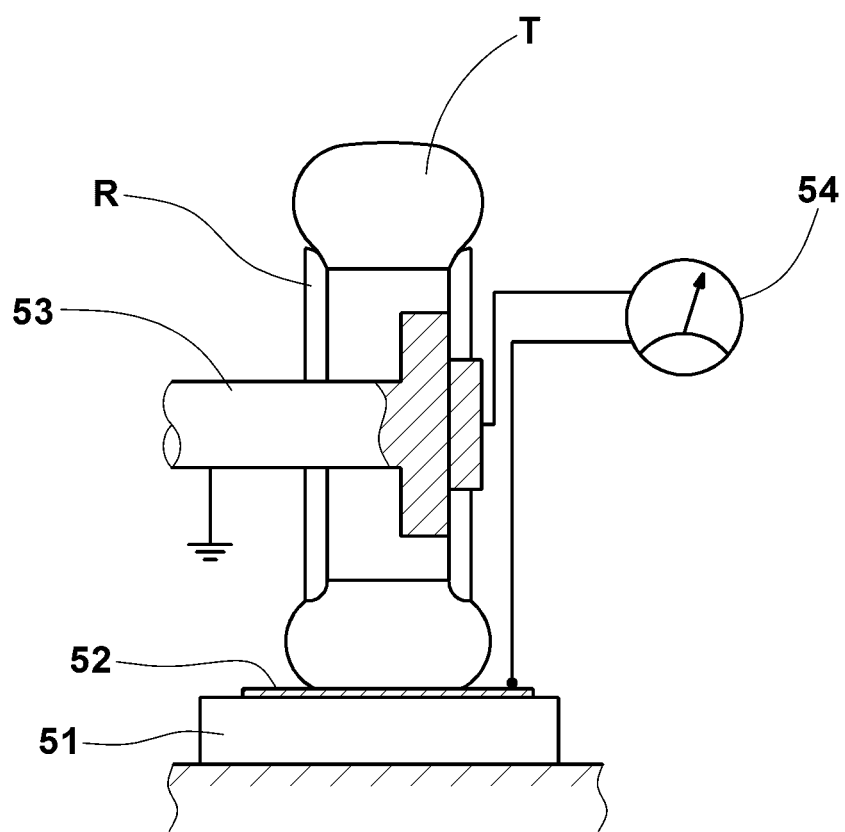
FIG. 6 is a schematic cross sectional view for explaining a method of measuring an electric resistance of a tire.

The electric resistance of the test tire was measured by using a measuring device comprising, as shown in FIG. 6, an insulating plate 51, a conductive metal plate 52 placed on the insulating plate 51, a conductive axle 53 to which a tire wheel R is attached to hold the test tire T, and a resistance meter 54.

The measurement was made according to the method prescribed by Japan Automobile Tire Manufacturers Association as follows. The test tire was cleaned off of a mould releasing agent and dirt, and dried before the measurement. The test tire T was mounted on a conductive tire wheel R made of an aluminum alloy, using soapy water as a lubricant between the tire and the tire wheel during the mounting operation.

The assembly of the tire T and the tire wheel R was left for two hours in an indoor environment under a temperature of 25 degrees C. and humidity of 50%, and then attached to the conductive axle 53.

The assembly attached to the axle 53 was set on the polished upper surface of the conductive metal plate 52, and applied by a tire load of 5.3 kN for half a minute, and again half a minute after a brief interruption, and further 2 minutes after a brief interruption.

Then, between the conductive axle 53 and the metal plate 52, a test voltage of 1000 V was applied, and after 5 minutes elapsed, the electric resistance therebetween was measured by using the resistance meter 54.

Such measurement was made at four measuring positions of the test tire at intervals of 90 degrees in the tire circumferential direction, and the maximum value among the values measured at the four measuring positions is used as the electric resistance (measured value).

The results are shown in Table 1.

<Durability>

Using a tire test drum, each test tire inflated to 360 KPa and load with a vertical tire load of 4.21 KN was continuously run until a separation failure was caused at the radially outer end of the conductive portion, and the travel distance to the separation failure was measured. For each test tire, the test was made ten times to obtain the average travel distance.

The results are indicated in Table 1 by an index based on Comparative Example Ref being 100, wherein the larger the value, the better the durability.

TABLE 1

| Tire | Ref | Ex1 | Ex2 | Ex3 | Ex4 | Ex5 | Ex6 |
|---|---|---|---|---|---|---|---|
| L1/h1 (%) | 0 | 47 | 40 | 53 | 18 | 60 | 60 |
| W1 (mm) | 0 | 2.0 | 1.5 | 2.5 | 2.5 | 1.0 | 2.5 |
| Sb/Sa (%) | 0 | 1.8 | 1.1 | 2.5 | 0.83 | 1.13 | 2.83 |
| L2 (mm) | 1.8 | 1.8 | 2.0 | 1.5 | 1.0 | 1.5 | 1.5 |
| angle θ1 (deg.) | 40 | 45 | 45 | 40 | 38 | 35 | 43 |
| electric resistance (mega ohm) | 2.0 | 2.0 | 2.0 | 2.0 | 2.0 | 2.0 | 10.0 |
| durability | 100 | 109 | 107 | 110 | 104 | 105 | 106 |

| Tire | Ex7 | Ex8 | Ex9 | Ex10 | Ex11 | Ex12 |
|---|---|---|---|---|---|---|
| L1/h1 (%) | 71 | 60 | 30 | 60 | 47 | 47 |
| W1 (mm) | 2.5 | 3.5 | 2.0 | 2.0 | 2.0 | 2.0 |
| Sb/Sa (%) | 3.33 | 3.96 | 1.1 | 2.29 | 1.8 | 1.8 |
| L2 (mm) | 1.5 | 0.2 | 1.8 | 1.8 | 1.8 | 1.8 |
| angle θ1 (deg.) | 35 | 45 | 45 | 45 | 50 | 60 |
| electric resistance (mega ohm) | 2.0 | 15.0 | 2.0 | 2.0 | 2.0 | 2.0 |
| durability | 106 | 104 | 108 | 109 | 109 | 109 |

From the test results, it was confirmed that the tires according to the present invention were improved in the durability of the tread portion, while reducing the electric resistance of the tire.

REFERENCE SIGNS LIST 2 tread portion
10 land portion
11 first axial edge
12 second axial edge
13 first side surface
14 second side surface
15 ground contacting top surface
17 conductive tire internal structure
20 conductive portion
21 radially outer end
22 radially inner end
24 radially inner part
25 radially outer part

The invention claimed is:

1. A pneumatic tire comprising:
a tread portion provided with a land portion having a top surface for contacting with the ground,
the land portion having a first side surface extending radially inwardly from a first axial edge of the top surface, and a second side surface extending radially inwardly from a second axial edge of the top surface,
the land portion provided with a conductive portion made of a conductive rubber,
the conductive portion having a radially outer end exposed in said top surface, and a radially inner end electrically connected to a conductive internal structure of the tire which is to be electrically connected to a wheel rim when the tire is mounted on the wheel rim,
wherein
in a cross section of the land portion taken along a plane including the rotational axis of the tire,
the conductive portion inclines to the first side surface of the land portion toward the radially outer end from the radially inner end of the conductive portion, so that the radially outer end of the conductive portion is closer to the first axial edge than the second axial edge,
the first side surface comprises a radially inner part and a radially outer part extending from the radially inner part to the first axial edge while inclining to the conductive portion at an inclination angle being larger than an inclination angle of the radially inner part,
the land portion is a circumferentially continuous rib,
a top surface of the land portion is provided with:
first center lug grooves extending from the first axial edge toward the conductive portion and terminating without intersecting the conductive portion in the top surface of the land portion, and
second center lug grooves extending from the second axial edge toward the conductive portion and terminating without intersecting the conductive portion in the top surface of the land portion,
the first center lug grooves and the second center lug grooves are inclined in the same direction with respect to the tire axial direction, and
the first center lug grooves have a length, and the second center lug grooves have a length greater than the length of the first center lug grooves.

2. The pneumatic tire according to claim 1, wherein in said cross section of the land portion, the angle between the conductive portion and said top surface is not less than 40 degrees and not more than 90 degrees.

3. The pneumatic tire according to claim 1, wherein the distance from the first axial edge to the radially outer end of the conductive portion is at least 1.5 mm.

4. The pneumatic tire according to claim 1, wherein in said cross section of the land portion, an area surrounded by said radially outer part, an axially extended line of said top surface and a radially outwardly extended line of said radially inner part is in a range from 1.0% to 2.5% of an overall area of the land portion.

5. The pneumatic tire according to claim 1, wherein in said cross section of the land portion, a radial height of said radially outer part of the first side surface is in a range from 30% to 60% of the radial height of the land portion.

6. The pneumatic tire according to claim 4, wherein the distance from the first axial edge to the radially outer end of the conductive portion is at least 1.5 mm.

7. The pneumatic tire according to claim 5, wherein the distance from the first axial edge to the radially outer end of the conductive portion is at least 1.5 mm.

8. The pneumatic tire according to claim 1, wherein the second center lug grooves extend while curving toward one direction and inclining with respect to the tire axial direction.

9. The pneumatic tire according to claim 8, wherein the first center lug grooves extend straight.

10. The pneumatic tire according to claim 9, wherein
the first center lug grooves are respectively connected to chamfered portions intermittently formed on the first axial edge by the radially outer part of the first side surface.

11. The pneumatic tire according to claim 10, wherein
the chamfered portions have a substantially constant axial width W1 along their respective entire lengths in the tire circumferential direction, and
the axial width W1 is in a range from 1.5 mm to 2.5 mm.

12. The pneumatic tire according to claim 11, wherein
the distance between the chamfered portions and the radially outer end of the conductive portion is in a range from 1.5 to 2.5 mm at the top surface of the land portion.

13. The pneumatic tire according to claim 12, wherein in said cross section of the land portion, the angle between the conductive portion and said top surface is not less than 40 degrees and not more than 90 degrees.

14. The pneumatic tire according to claim 12, wherein
the chamfered portions have a radial height in a range from 30% to 60% of the overall height of the land portion.

15. A pneumatic tire comprising:
a tread portion provided with a land portion having a top surface for contacting with the ground,
the land portion having a first side surface extending radially inwardly from a first axial edge of the top surface, and a second side surface extending radially inwardly from a second axial edge of the top surface,
the land portion provided with a conductive portion made of a conductive rubber,
the conductive portion having a radially outer end exposed in said top surface, and a radially inner end electrically connected to a conductive internal structure of the tire which is to be electrically connected to a wheel rim when the tire is mounted on the wheel rim, wherein
in a cross section of the land portion taken along a plane including the rotational axis of the tire,
the conductive portion inclines to the first side surface of the land portion toward the radially outer end from the radially inner end of the conductive portion, so that the radially outer end of the conductive portion is closer to the first axial edge than the second axial edge, and
the angle between the conductive portion and said top surface is not less than 40 degrees and not more than 90 degrees,
wherein
the first side surface comprises a radially inner part and a radially outer part extending from the radially inner part to the first axial edge while inclining to the conductive portion at an inclination angle being larger than an inclination angle of the radially inner part,
in said cross section of the land portion, a radial height of said radially outer part of the first side surface is in a range from 30% to 60% of the radial height of the land portion, and
in said cross section of the land portion, an area surrounded by said radially outer part, an axially extended line of said top surface and a radially outwardly extended line of said radially inner part is in a range from 1.0% to 2.5% of an overall area of the land portion,
wherein
said top surface of the land portion is provided with:
first center lug grooves extending from the first axial edge toward the conductive portion and terminating without intersecting the conductive portion in the top surface of the land portion, and
second center lug grooves extending from the second axial edge toward the conductive portion and terminating without intersecting the conductive portion in the top surface of the land portion, whereby the land portion is formed as a circumferentially continuous rib,
wherein
the first center lug grooves and the second center lug grooves are arranged alternately in the tire circumferential direction,
the first center lug grooves and the second center lug grooves are inclined in the same direction with respect to the tire axial direction,
the second center lug grooves extend while curving toward one direction and inclining with respect to the tire axial direction, whereas the first center lug grooves extend straight, and
the first center lug grooves have a length, and the second center lug grooves have a length greater than the length of the first center lug grooves, and
wherein
the first center lug grooves are respectively connected to chamfered portions intermittently formed on the first axial edge by the radially outer part of the first side surface,
the chamfered portions have a substantially constant axial width W1 along their respective entire lengths in the tire circumferential direction, and the axial width W1 is in a range from 1.5 mm to 2.5 mm, and
the distance between the chamfered portions and the radially outer end of the conductive portion is in a range from 1.5 to 2.5 mm at the top surface of the land portion.

* * * * *